US012784959B2

(12) United States Patent
Kuo et al.

(10) Patent No.: US 12,784,959 B2

(45) Date of Patent: Nov. 3, 2026

(54) INTEGRATED COUPLING INDUCTOR

(71) Applicant: ITG Electronics, Inc., Elmsford, NY (US)

(72) Inventors: Martin Kuo, Elmsford, NY (US); Nanhai Zhu, Elmsford, NY (US)

(73) Assignee: ITG ELECTRONICS, INC., Elmsford, NY (US)

( * ) Notice: Subject to any disclaimer, the term of this patent is extended or adjusted under 35 U.S.C. 154(b) by 694 days.

(21) Appl. No.: 18/223,599

(22) Filed: Jul. 19, 2023

(65) Prior Publication Data

US 2025/0029766 A1 Jan. 23, 2025

(51) Int. Cl.
*H01F 27/24* (2006.01)

(52) U.S. Cl.
CPC .................................... *H01F 27/24* (2013.01)

(58) Field of Classification Search
CPC ....................................................... H01F 27/24
See application file for complete search history.

(56) References Cited

U.S. PATENT DOCUMENTS

2010/0026441 A1* 2/2010 Wedley ................. H01F 17/043 336/221
2022/0165475 A1* 5/2022 Tsai .................... H01F 27/2847
2025/0111979 A1* 4/2025 Zhao ......................... H01F 3/10
2025/0140460 A1* 5/2025 Fujimaki .................. H01F 3/10

FOREIGN PATENT DOCUMENTS

CN 103366922 A * 10/2013
CN 112927901 A * 6/2021 ............. H01F 27/24
CN 117373804 A * 1/2024 ............. H01F 29/10
JP 2021019030 A * 2/2021

* cited by examiner

*Primary Examiner* — Malcolm Barnes
(74) *Attorney, Agent, or Firm* — Li & Cai Intellectual Property (USA) Office

(57) ABSTRACT

An integrated coupling inductor includes a magnetic core frame, a magnetic core, two magnetic core columns, and two coil assemblies. The magnetic core is disposed on the magnetic core frame. In a first direction, a first space and a second space are defined by the magnetic core and the two inner wall surfaces of the magnetic core frame. In a second direction, a third space and a fourth space is defined by the magnetic core and two inner wall surfaces of the magnetic core frame. The two magnetic core columns are respectively disposed in the first space and the second space. One end of each of the magnetic core columns is connected to the magnetic core, and another end extends toward the inner wall surface of the magnetic core frame. The two coil assemblies are respectively sleeved around the two magnetic core columns.

7 Claims, 9 Drawing Sheets

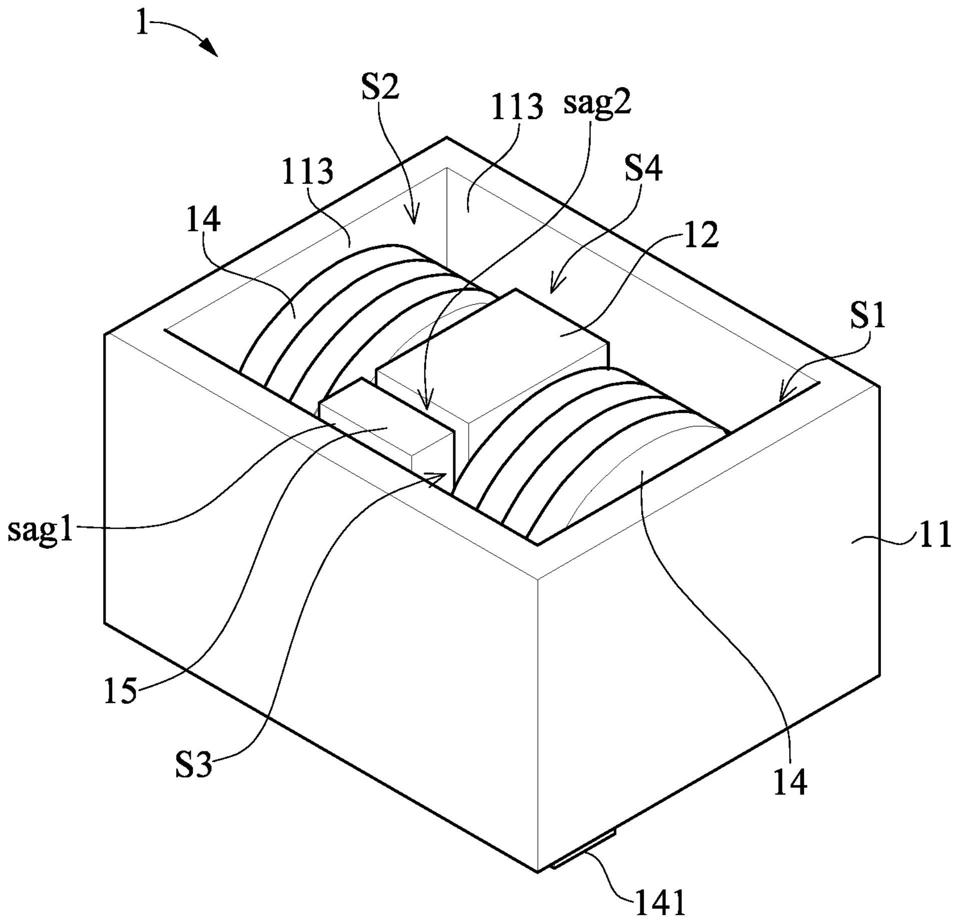
FIG. 5
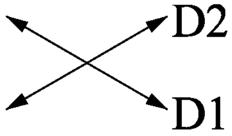

INTEGRATED COUPLING INDUCTOR

FIELD OF THE DISCLOSURE

The present disclosure relates to an inductor structure, and more particularly to an inductor structure having a gap.

BACKGROUND OF THE DISCLOSURE

An inductor is a kind of passive component and widely used in electronic products. The inductor can resist current changes in electronic circuits, thereby having functions of filtering current noise, stabilizing the current value in the circuit, reducing electromagnetic interference and power conversion.

For the foregoing electronic products such as voltage converters, when the magnetic flux of the internal inductor reaches the maximum value, the magnetic core of the inductor is in a state of magnetic saturation. At this time, the magnetic induction in the magnetic core will no longer increase with the increase of the coil current, and the voltage converter loses the function of energy exchange. In the continuous transmission of current, since the energy cannot be converted, the energy will be lost in the internal damping of the coil, and when the loss reaches a certain level, the voltage converter will eventually be damaged.

In the conventional technology, the directionality of an electromagnetic circuit is often limited due to the structural design of the inductor, and the selection of the electromagnetic circuit is inflexible. Therefore, how to improve the inductance used in electronic devices by improving the structural design efficiency to overcome the foregoing defects has become one of the important issues to be solved in this related field.

SUMMARY OF THE DISCLOSURE

In response to the above-referenced technical inadequacies, the present disclosure provides an integrated coupling inductor with controllable leakage inductance and reduced loss in view of the deficiencies of the prior art. According to certain embodiments, the integrated coupling inductor is used in a voltage converter, which can improve the electromagnetic characteristics, increase the power of the voltage converter and reduce the loss of the voltage converter. According to certain embodiments, the integrated coupling inductor also has the function of changing the magnetic circuit, so that the integrated coupling inductor could have a wide variety of applications.

In one aspect, the present disclosure provides an integrated coupling inductor, which includes a magnetic core frame, a magnetic core, and two magnetic core columns. The magnetic core frame has a receiving space. The magnetic core is disposed on a center of an inner part of the magnetic core frame, the central magnetic core has two first surfaces perpendicular to a first direction, a first space and a second space are respectively defined by the two first surfaces and inner wall surface of the magnetic core frame, and the magnetic core has two second surfaces perpendicular to a second direction, and a third space and a fourth space are defined by the two second surfaces and the inner wall surfaces of the magnetic core frame, the first direction and the second direction are intersected. Two magnetic core columns are respectively disposed on the first space and the second space, one end of each of the two magnetic core columns is connected to the magnetic core, and another end of each of the two magnetic core columns extends toward the inner wall surface of the magnetic core frame, so as to define an extension end. Two coil assemblies are respectively sleeved around the two magnetic core columns.

In certain embodiments, the extension end of at least one of the two magnetic core columns and the inner wall surface of the magnetic core frame has a gap therebetween.

In certain embodiments, the extension ends of the two magnetic core columns are respectively connected to the inner wall surfaces of the magnetic core frame.

In certain embodiments, an integrated coupling inductor further comprises one side magnetic core disposed in the third space, and the side magnetic core is disposed between the magnetic core and the inner wall surface of the magnetic core frame.

In certain embodiments, an integrated coupling inductor further comprises another side magnetic core disposed in the fourth space, and the another side magnetic core is disposed between the magnetic core and the inner wall surface of the magnetic core frame.

In certain embodiments, each of the two magnetic core columns is a cylinder or a square column.

In certain embodiments, a shape enclosed by the inner wall surfaces is a circle or a polygon.

In certain embodiments, the magnetic core and the two magnetic core columns are integrally formed.

In certain embodiments, a coil of each of the two coil assemblies is a flat coil or a circular coil.

One of the beneficial effects of the present disclosure is that, in the integrated coupling inductor provided by the present disclosure, by virtue of "the structure of the magnetic core and the two magnetic core columns, and a spatial relationship in the magnetic core frame", the integrated coupling inductor can have one or more gaps. The gap can affect the magnetic resistance of the coupling inductor, the effective magnetic permeability of the magnetic core, the current, the leakage inductance and other electromagnetic factors. The gap can increase the saturation current of the integrated coupling inductor. In addition, the electromagnetic circuit of the inductance can also be changed, so that the power and function of the applied electronic product can be improved, and an internal loss of the electronic product can be reduced.

One of the beneficial effects of the present disclosure is that, in the integrated coupling inductor provided by the present disclosure, by virtue of "one or more side magnetic cores being disposed within the magnetic core frame so as to increase a quantity of the gap (a side gap)", the saturation current and leakage inductance of the integrated coupling inductor can be controlled, and the electromagnetic circuit can be changed, so as to improve the power and function of the applied electronic products. In addition, it also has the effect of reducing the internal loss of electronic products.

In order to further understand the features and technical content of the present disclosure, please refer to the following detailed description and drawings of the present disclosure. However, the drawings provided are only for reference and description, and are not intended to limit the present disclosure.

BRIEF DESCRIPTION OF THE DRAWINGS

The described embodiments may be better understood by reference to the following description and the accompanying drawings, in which:

FIG. 5 is a schematic external view of an integrated coupling inductor according to a second embodiment of the present disclosure;

DETAILED DESCRIPTION OF THE EXEMPLARY EMBODIMENTS

Figure 1:
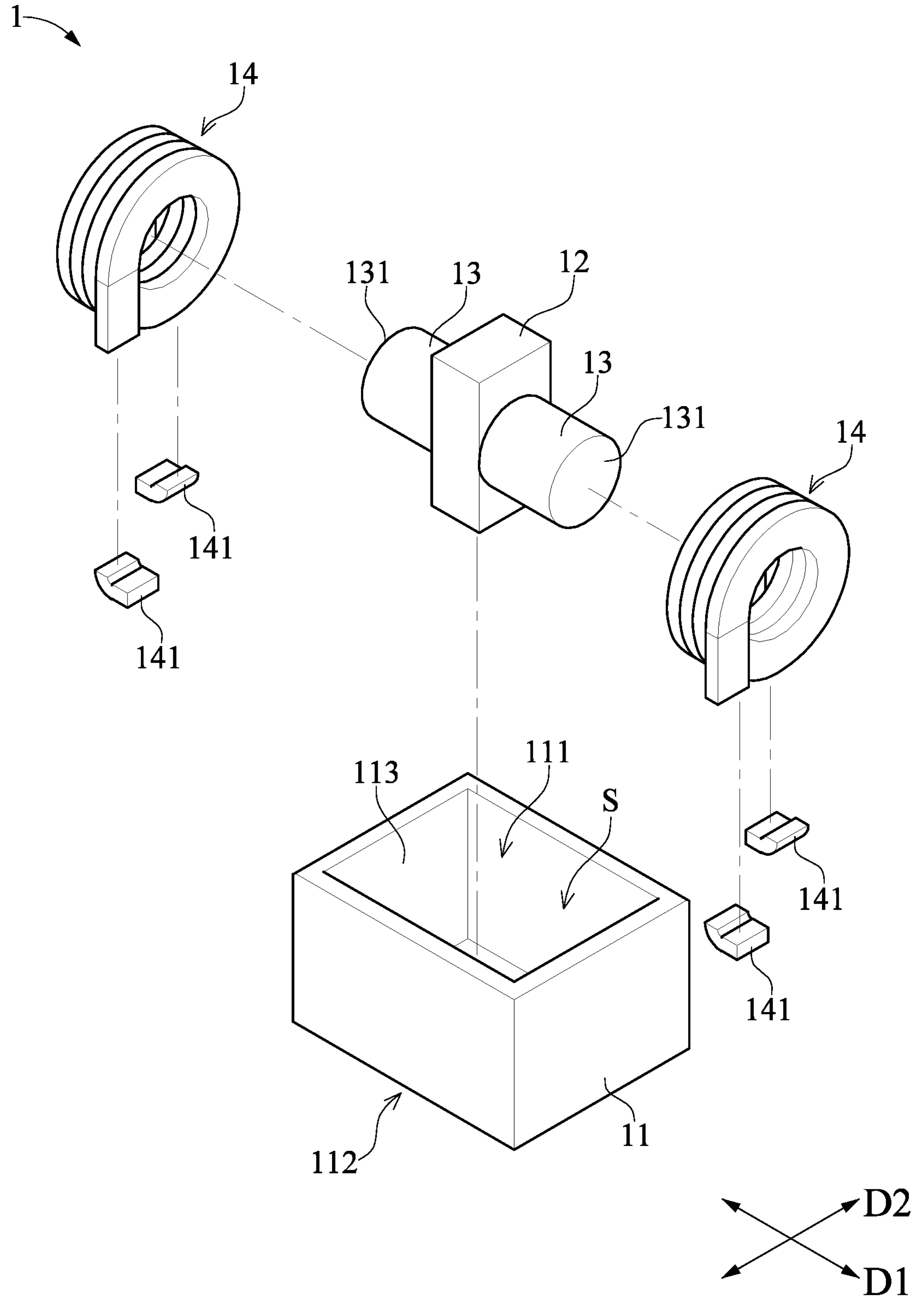
FIG. 1 is a schematic exploded view of an integrated coupling inductor according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a”, “an”, and “the” includes plural reference, and the meaning of “in” includes “in” and “on”. Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first,” “second” or “third” can be used to describe various components, signals or the like, which are for distinguishing one component/signal from another one only, and are not intended to, nor should be construed to impose any substantive limitations on the components, signals or the like.

First Embodiment

Figure 2:
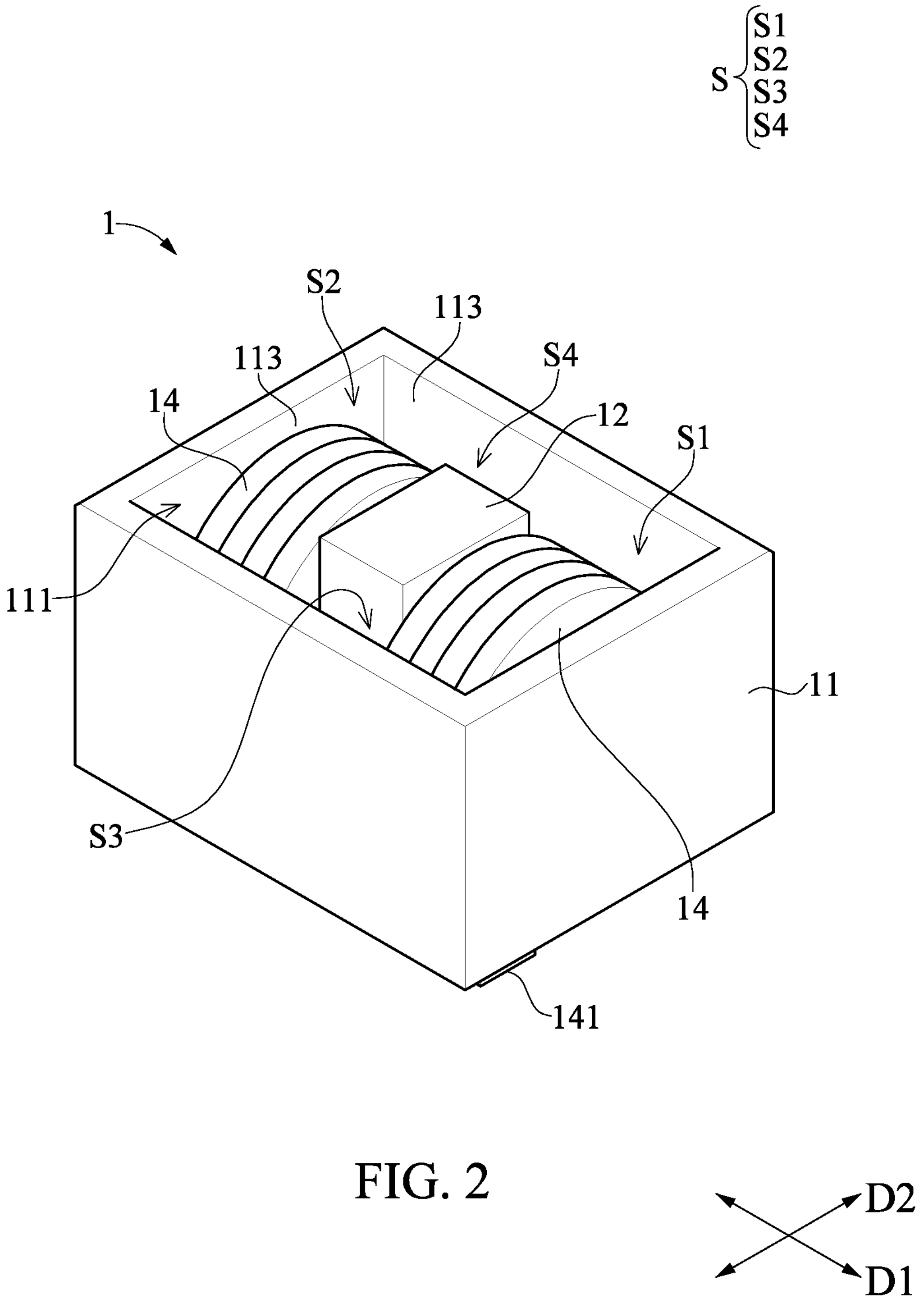
FIG. 2 is a schematic assembled view of FIG. 1.
Figure 3:
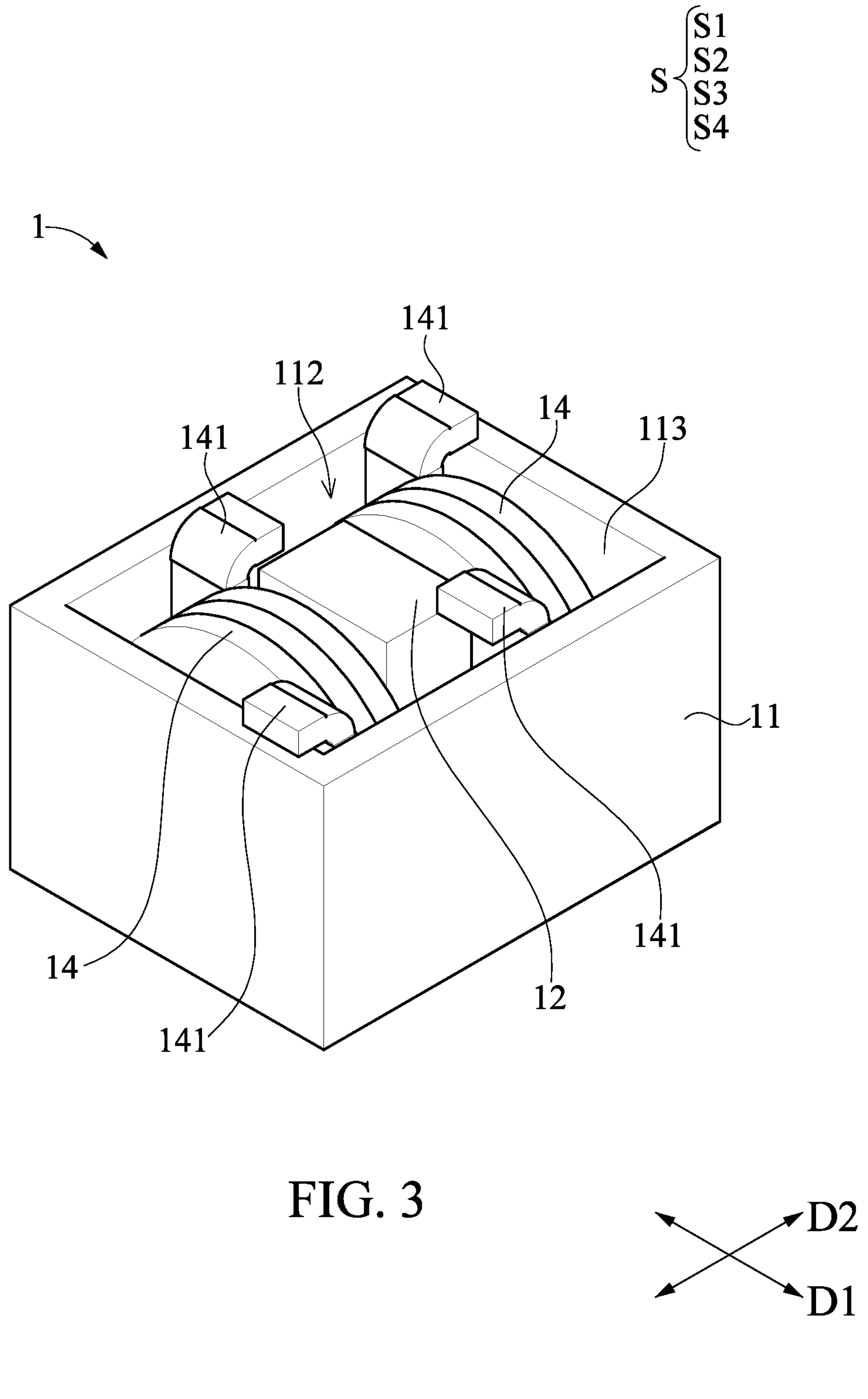
FIG. 3 is another schematic view of FIG. 2.
Figure 4:
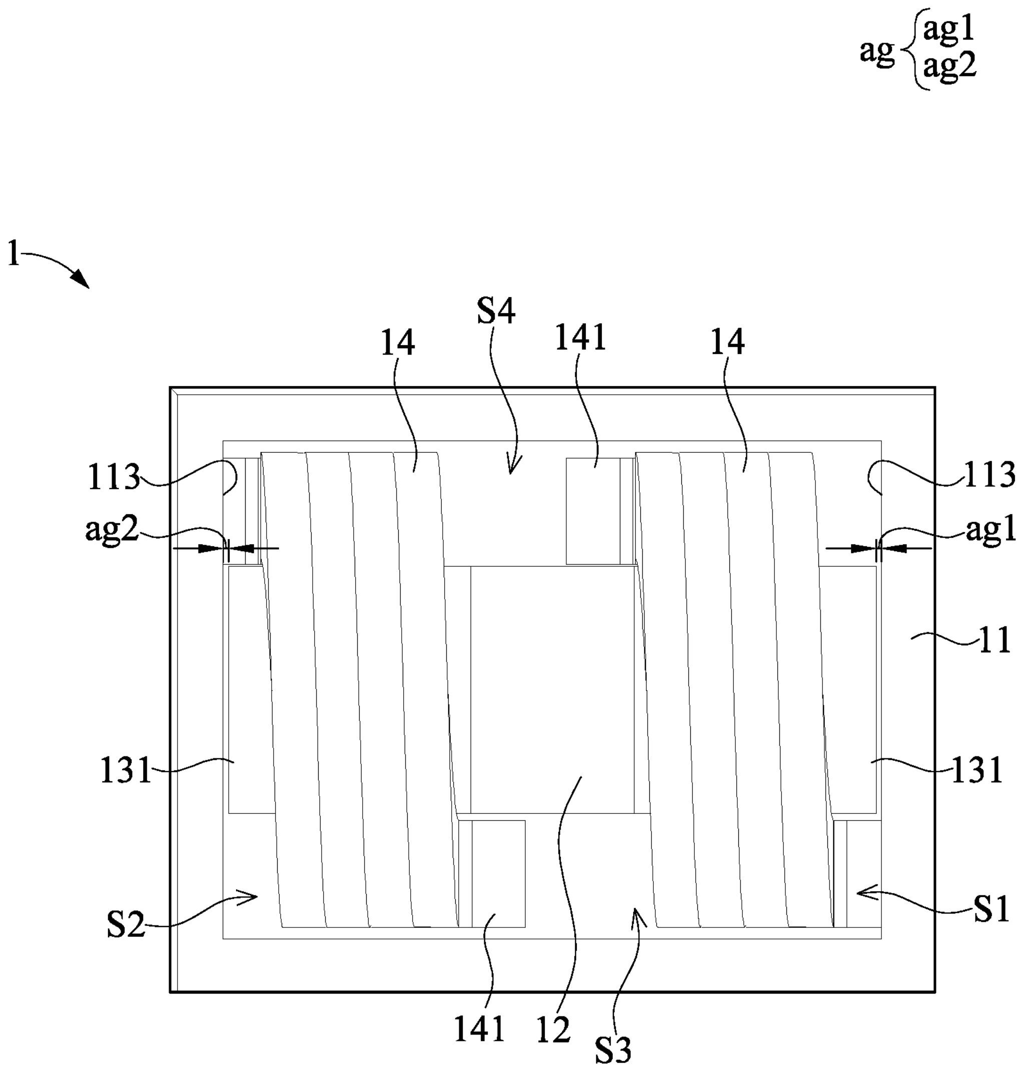
FIG. 4 is a top view of FIG. 2.

Referring to FIG. 1 to FIG. 4, FIG. 1 is an exploded schematic view of an integrated coupling inductor 1 according to a first embodiment of the present disclosure. FIG. 2 is an assembled view of FIG. 1. FIG. 3 is another schematic view of FIG. 2. FIG. 4 is a top view of FIG. 2.

Figure 9:
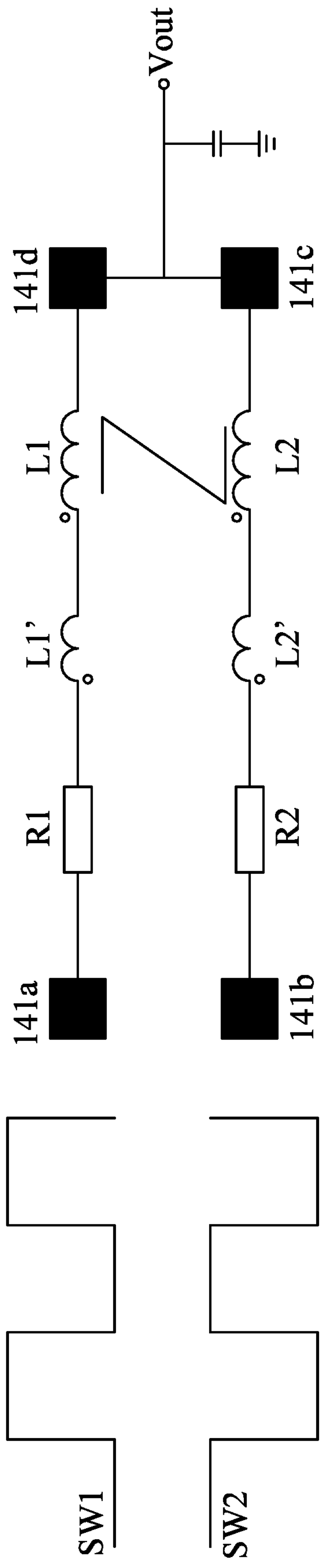
FIG. 9 is an equivalent circuit diagram of an integrated coupling inductor used in a power converter according to one embodiment of the present disclosure.

The integrated coupling inductor 1 includes a magnetic core frame 11, a magnetic core 12, two magnetic core columns 13, and two coil assemblies 14. The magnetic core frame 11 has a receiving space S. According to the embodiment shown in FIG. 1, the magnetic core frame 11 has an upper opening 111 and a lower opening 112, and the receiving space S is a spatial communication between the upper opening 111 and the lower opening 112. The magnetic core 12 is disposed at a center of an inner part of the magnetic core frame 11. The magnetic core 12 has two first surfaces perpendicular to a first direction D1, and a first space S1 and a second space S2 are defined by the two first surfaces and inner wall surface 113 of the magnetic core frame 11. The magnetic core 12 further has two second surfaces perpendicular to a second direction D2, and a third space S3 and a fourth space S4 are defined by the two second surfaces and the inner wall surface 113 of the magnetic core frame 11. The first direction D1 and the second direction D2 are intersected. In certain embodiments, the first direction D1 and the second direction D2 are perpendicular to each other. The two magnetic core columns 13 are respectively disposed in the first space S1 and the second space S2. One end of each of the two magnetic core columns 13 is connected to the magnetic core 12, and another end of each of the two magnetic core columns 13 extends toward the inner wall surface 113 of the magnetic core frame 11 so as to define an extension end 131. The two coil assemblies 14 are respectively sleeved around the two magnetic core columns 13. The upper opening 111 and the lower opening 112 of the magnetic core frame 11 have the same shape. According to the embodiment shown in FIG. 1, each of the upper opening 111 and the lower opening 112 is rectangular. According to certain embodiments, each of the upper opening 111 and the lower opening 112 is circular. According to certain embodiments, each of the upper opening 111 and the lower opening 112 is polygonal. However, the present disclosure is not limited thereto. In addition, according to certain embodiments, each of the upper opening 111 and the lower opening 112 is square. In other words, the shape enclosed by the inner wall surface 113 of the magnetic core frame 11 is not limited in the present disclosure. The magnetic core 12 is a cubical structure. According to the embodiment shown in FIG. 1, the magnetic core 12 is a cube. According to certain embodiments, the magnetic core 12 is a flat cylinder, but the present disclosure is not limited thereto. The two magnetic core columns 13 are mirror symmetric to each other with respect to the magnetic core 12. According to the embodiment shown in FIG. 1, each of the two magnetic core columns 13 is a cylinder. According to certain embodiments, each of the two magnetic core columns 13 is a squared column. According to the embodiment shown in FIG. 1, the extension end 131 of each of the two magnetic core columns 13 and the inner wall surface 113 of the magnetic core frame 11 has a gap ag therebetween. The gap ag filled with air is referred to an air gap. In certain embodiments, the gap ag is filled with a plastic material, such as a Mylar sheet or a polyester film (PET film). According to certain embodiments, the gap ag is filled with curing glue. In such the embodiments, the two gaps ag can be referred to a first gap ag1 and a second gap ag2, and a width of the first gap ag1 and a width of the second gap ag2 can be the same or different, depending on user requirements. In addition, according to some embodiments, the extension end 131 of one of the two magnetic core columns 13 is substantially close to (or connected to) the inner wall surface 113 of the magnetic core frame 11, and the other magnetic core column 13 and the inner wall surface 113 of the magnetic core frame 11 has a gap ag therebetween. In some embodiments, the extension end 131 of the two magnetic core columns 13 are substantially close to (or connected to) the inner wall surface 113 of the magnetic core frame 11, that is, the inner wall surface 113 of the magnetic core column 13 and the magnetic core frame 11 has no gap ag therebetween. The gap ag has the functions of reducing the effective magnetic permeability of the magnetic core, increasing the saturation current of the inductor, affecting the leakage inductance, and increasing the storage capacity depending on a size and a filler of the gap ag. In addition, the gap ag also has the function of changing the magnetic circuit of the electromagnetic coupling. The present disclosure does not limit the filler, quantity and width of the gap ag, and can be determined according to the user electrical requirements (such as leakage inductance and magnetic circuit direction). Each of the magnetic core frame 11, the magnetic core 12, and the magnetic core columns 13 can be, but not limited to, ferrite or a soft magnetic material. The two coil assemblies 14 are respectively sleeved around the two magnetic core columns 13. Through disposing the integrated coupling inductor 1 on a circuit board, an inductive coupling can be generated between two of the coil assemblies 14 when a current flows through (as shown in FIG. 9). According to the embodiment shown in FIG. 1, a coil can be a flat coil, and is provided with a metal pin 141, which is convenient for disposing the integrated coupling inductor 1 on an electric substrate (such as a circuit board). In some embodiments, the metal pin 141 is a part of the coil. In addition, according to some embodiments, the coil can be a circular coil, but the present disclosure is not limited thereto. The coil can be selected depending on the user requirements. According to certain embodiments, the coil of the coil assemblies 14 can be made of copper (Cu), aluminum (Al), silver (Ag), or alloys thereof. According to certain embodiments, in addition to the aforementioned metal materials, the coil material of the coil assemblies 14 may also be made of other conductive materials.

Second Embodiment

Figure 6:
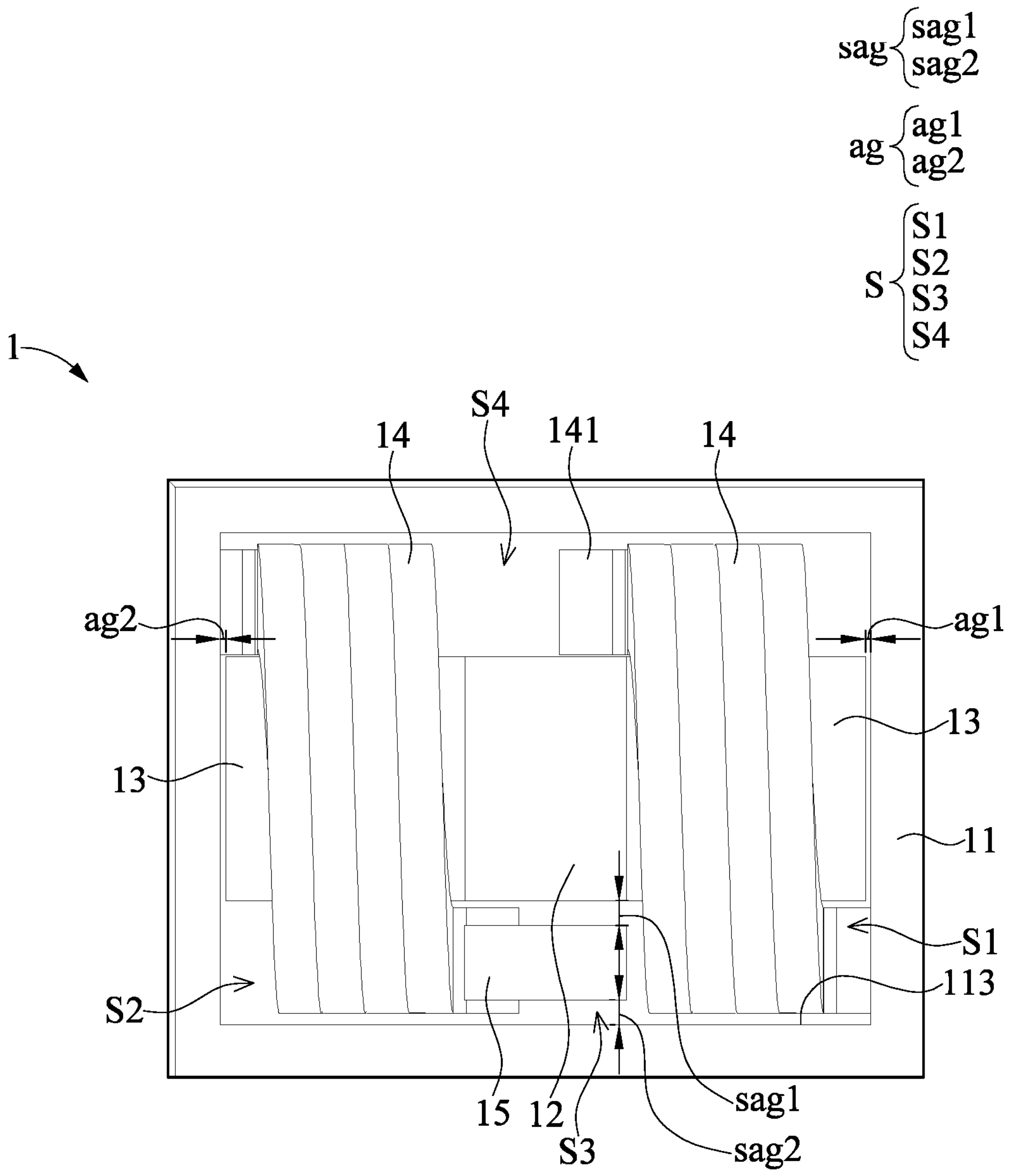
FIG. 6 is s a top view of FIG. 5.

Referring to FIG. 5 and FIG. 6, FIG. 5 is a schematic external view of an integrated coupling inductor 1 according to the second embodiment of the present disclosure. FIG. 6 is s a top view of FIG. 5. According to the embodiment shown in FIG. 5 and FIG. 6, the integrated coupling inductor 1 further includes one side magnetic core 15. The side magnetic core 15 is disposed in the third space S3, and is disposed between the magnetic core 12 and the inner wall surface 113 of the magnetic core frame 11. In the present embodiment, aside gap sag is correspondingly formed between the side magnetic core 15 and the magnetic core 12 and between the side magnetic core 15 and the inner wall surface 113 of the magnetic core frame 11. According to the embodiment shown in FIG. 6, there are two side gaps sag, which are respectively referred to a side gap sag1 and a second side gap sag2. A size of the first side gap sag1 and a size of the second side gap sag2 can be the same or different. It should be noted that, in the embodiment shown in FIG. 6, a quantity of the side magnetic core 15 in the third space S3 is one. However, according to certain embodiments, there can be multiple side magnetic cores 15 in the third space S3 and the multiple side magnetic cores 15 can be spaced apart, such that multiple side gaps sage can be formed in the third space S3, which can control the leakage inductance and the direction of the electromagnetic circuit. Further, according to certain embodiments, the side magnetic body 15 is substantially adjacent to (or connected to) the inner wall surface 113 of the magnetic core frame 11, and only the second side gap sag2 is formed between the side magnetic core 15 and the magnetic core 12. However, the present disclosure is not limited thereto, and a filler material, a quantity and a width of the side gap sag can be determined according to the user requirements on an electrical property (such as the leakage inductance and the direction of the electromagnetic circuit).

Figure 7:
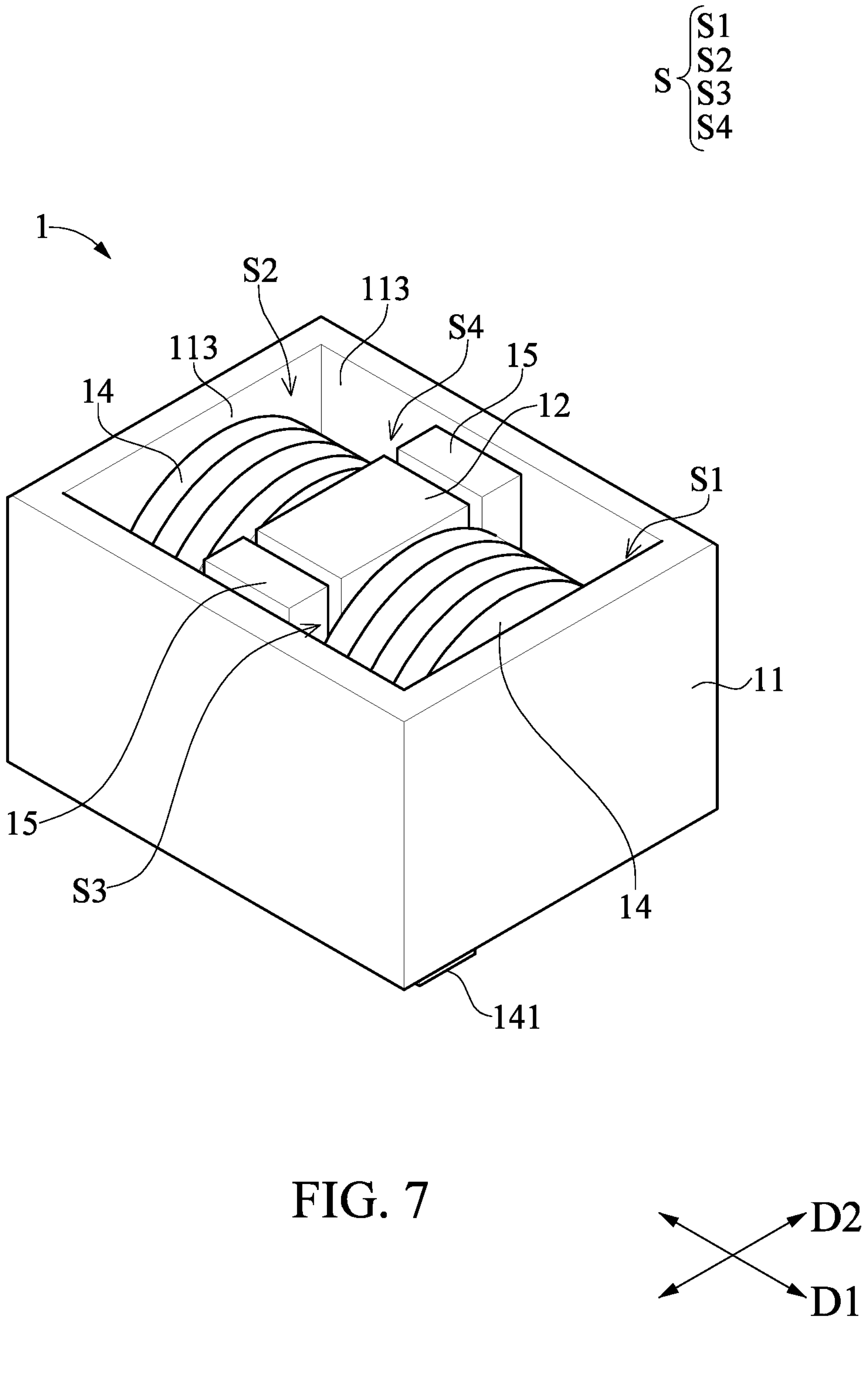
FIG. 7 is a schematic assembled view of an integrated coupling inductor according to a third embodiment of the present disclosure.
Figure 8:
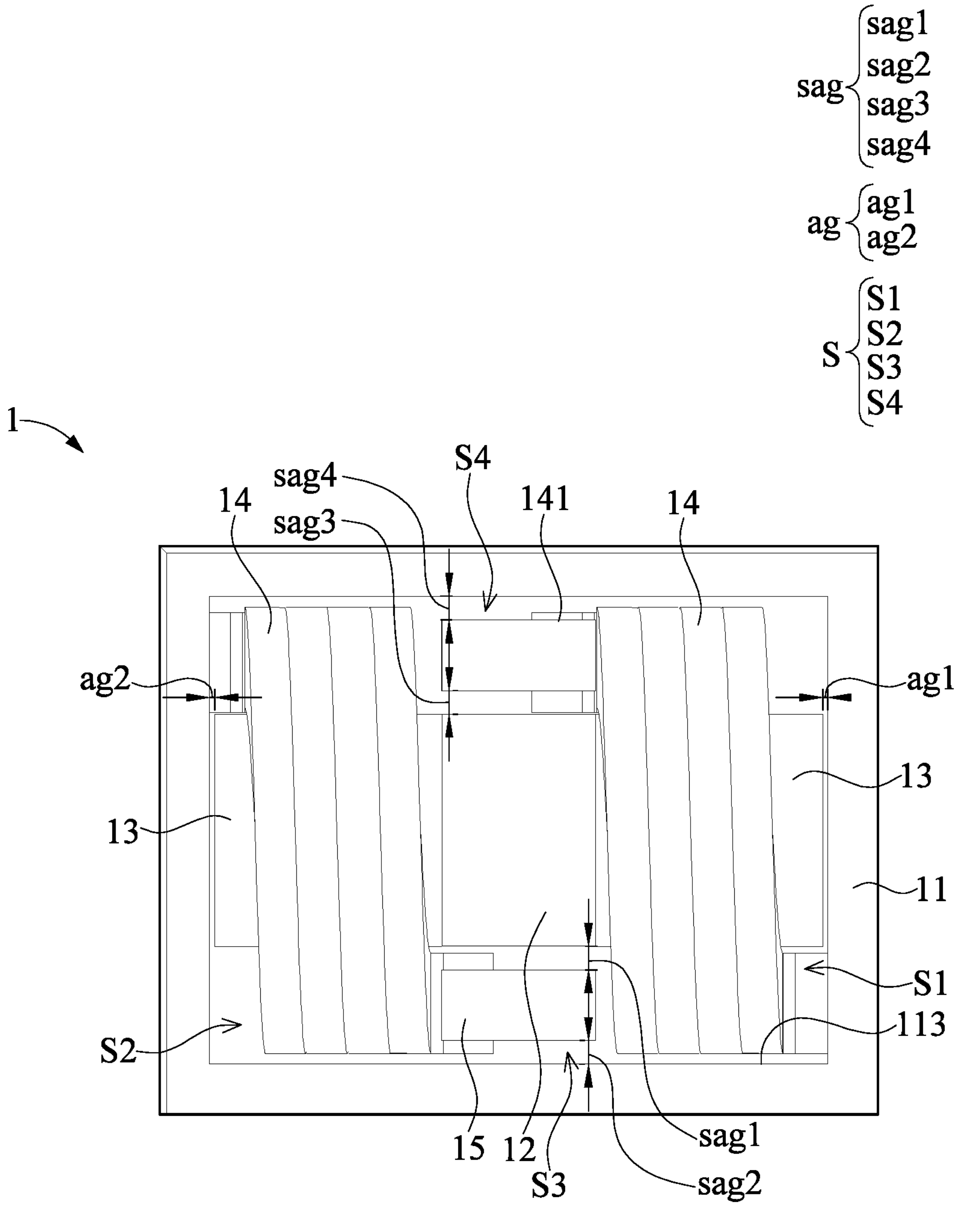
FIG. 8 is a top view of FIG. 7.

Referring to FIG. 7 and FIG. 8, FIG. 7 is a schematic assembled view of an integrated coupling inductor 1 according to a third embodiment of the present disclosure. FIG. 8 is a top view of FIG. 7. According to the present embodiment, the integrated coupling inductor 1 further includes another side magnetic core 15. The another side magnetic core 15 is disposed in the fourth space S4 and disposed between the magnetic core 12 and the inner wall surfaces 113 of the magnetic core frame 11. Different from the embodiment shown in FIG. 6, in the embodiment shown in FIG. 7, the integrated coupling inductor 1 includes two side magnetic cores 15, which are respectively disposed in the third space S3 and the fourth space S4. Two side gaps sag are respectively formed between the another side magnetic core 15 and the magnetic core 12 and between the another side magnetic core 15 and the inner wall surface 113 of the magnetic core frame 11, and the two side gaps sag are respectively referred to a third side gap sag3 and a fourth side gap sag4. According to the embodiment shown in FIG. 7, the integrated coupling inductor 1 has two gaps ag in the first direction D1 and four side gaps sag in the second direction D2. According to certain embodiments, the side magnetic core 15 in the fourth space S4 is substantially adjacent to (or connected to) the inner wall surface 113 of the magnetic core frame 11, and only the third side gap sag3 is formed between the side magnetic core 15 and the magnetic core 12. In addition, according to certain embodiments, the two side magnetic cores 15 are substantially adjacent to (or connected to) the inner wall surface 113 of the magnetic core frame 11, respectively, and the integrated coupling inductor 1 only has the first side gap sag1 and the third side gap sag3. In addition, according to certain embodiments, the two side magnetic core 15 are correspondingly and substantially adjacent to (or connected to) the magnetic core 12, and the integrated coupling inductor 1 only has the second side gap sag2 and the fourth side gap sag4. Therefore, there can be multiple side magnetic cores 15 having the gaps therebetween in the fourth space S4, so that multiple side gaps sag can be formed. Since the filling material, the quantity and the width of the side gap sag will affect the direction of the electromagnetic circuit, the magnitude of the current and the magnitude of the leakage inductance, and further affect the power and function of the electronic products used. However, the present disclosure is not limited thereto, and can be determined according to the user requirements.

Referring to FIG. 9, FIG. 9 is an equivalent circuit diagram of an integrated coupling inductor 1 used in a power converter according to one embodiment of the present disclosure. A voltage source VS correspondingly provides a certain electromotive force at two output terminals. The two output terminals of the voltage source VS can be respectively and electrically connected to two inductors L1, L2 through switches SW1, SW2. The two inductors L1, L2 can be realized by the magnetic core frame 11, and the magnetic core 12 of the integrated coupling inductor 1 described above. The two coil assemblies 14 are disposed on the circuit board correspondingly through metal pins 141*a*, 141*b*, 141*c*, and 141*d*. The two coil assemblies 14 respectively have internal impedances R1, R2, and one of the two coil assemblies 14 can generate inductance L1' and/or inductance L2' by interacting with the magnetic core frame 11 and the magnetic core 12. The two inductors L1, L2 are correspondingly and electrically connected to an output port Vout, and the output port Vout provides a second voltage for an external circuit. The foregoing embodiments illustrate the application of the integrated coupling inductor 1 of the present disclosure to a voltage converter. However, the integrated coupling inductor 1 of the present disclosure is not limited to be applied only to the voltage converter.

According to certain embodiments, the magnetic core 12 and magnetic core columns 13 can be assembled with each other. In addition, according to certain embodiments, the magnetic core 12 and the two magnetic core columns 13 are integrally formed, such that the time and cost of the manufacturing process can be decreased.

Beneficial Effects of the Embodiments

One of the beneficial effects of the present disclosure is that, the integrated coupling inductor provided by the present disclosure, by virtue of "the structure of the magnetic core and the two magnetic core columns, and a spatial relationship in the magnetic core frame", so that the integrated coupling inductor have one or more gaps. The gap can affect the magnetic resistance of the coupling inductor, the effective magnetic permeability of the magnetic core, the current, the leakage inductance, and other electromagnetic factors. The saturation current of the integrated coupling inductor can be increased by the gap. In addition, the electromagnetic circuit of the inductance can also be changed, so as to improve the power and function of the applied electronic products, and reduce an internal loss of the electronic product.

One of the beneficial effects of the present disclosure is that, the integrated coupling inductor provided by the present disclosure, by virtue of "one or more side magnetic cores being disposed within the magnetic core frame so as to increase a quantity of the gap (a side gap)", the saturation current and leakage inductance of the integrated coupling inductor can be controlled, and the electromagnetic circuit can be changed, so as to improve the power and function of the applied electronic products. In addition, it also has the effect of reducing the internal loss of electronic products The disclose content above is only the preferred feasible embodiment of the present disclosure, and is not therefore limiting the patent scope of the present disclosure, so all equivalent technical changes made by using the description of the present disclosure and the contents of the drawings are included in this document within the scope of the patent application.

What is claimed is:

1. An integrated coupling inductor, comprising:

a magnetic core frame, the magnetic core frame having a receiving space;

a magnetic core disposed on a center of an inner part of the magnetic core frame, wherein the magnetic core has two first surfaces perpendicular to a first direction, a first space and a second space are defined by the two first surfaces and inner wall surface of the magnetic core frame; wherein the magnetic core has two second surfaces perpendicular to a second direction, and a third space and a fourth space are defined by the two second surfaces and the inner wall surfaces of the magnetic core frame; wherein the first direction and the second direction are intersected;

two magnetic core columns respectively disposed on the first space and the second space, wherein one end of each of the two magnetic core columns is connected to the magnetic core, and another end of each of the two magnetic core columns extends toward the inner wall surface of the magnetic core frame, so as to define an extension end; and two coil assemblies respectively sleeved around the two magnetic core columns;

wherein the extension end of at least one of the two magnetic core columns and the inner wall surface of the magnetic core frame has a gap therebetween.

2. The integrated coupling inductor according to claim 1, further comprising one side magnetic core disposed in the third space, wherein the side magnetic core is disposed between the magnetic core and the inner wall surface of the magnetic core frame.

3. The integrated coupling inductor according to claim 2, further comprising another side magnetic core disposed in the fourth space, wherein the another side magnetic core is disposed between the magnetic core and the inner wall surface of the magnetic core frame.

4. The integrated coupling inductor according to claim 1, wherein each of the two magnetic core columns is a cylinder or a square column.

5. The integrated coupling inductor according to claim 1, wherein a shape enclosed by the inner wall surfaces is a circle or a polygon.

6. The integrated coupling inductor according to claim 1, wherein the magnetic core and the two magnetic core columns are integrally formed.

7. The integrated coupling inductor according to claim 1, wherein a coil of each of the two coil assemblies is a flat coil or a circular coil.

* * * * *